No. 860,398. PATENTED JULY 16, 1907.
J. E. LYNAM.
MACHINE FOR MAKING BERRY BOXES.
APPLICATION FILED JULY 31, 1905.
6 SHEETS—SHEET 2.
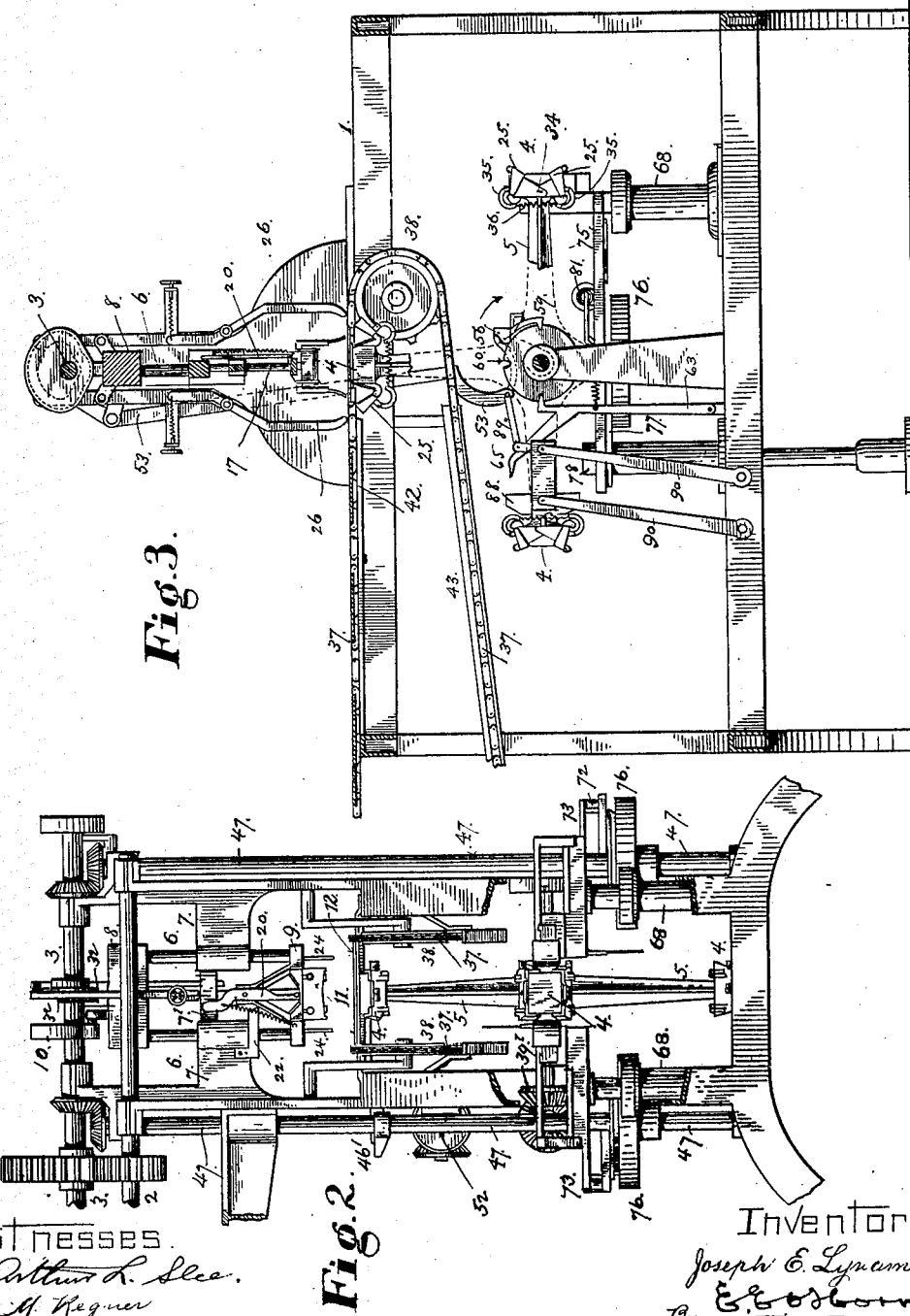
Witnesses
Arthur L. Slee.
M. Regner
Inventor.
Joseph E. Lynam,
By E. E. Osborn
his Attorney.

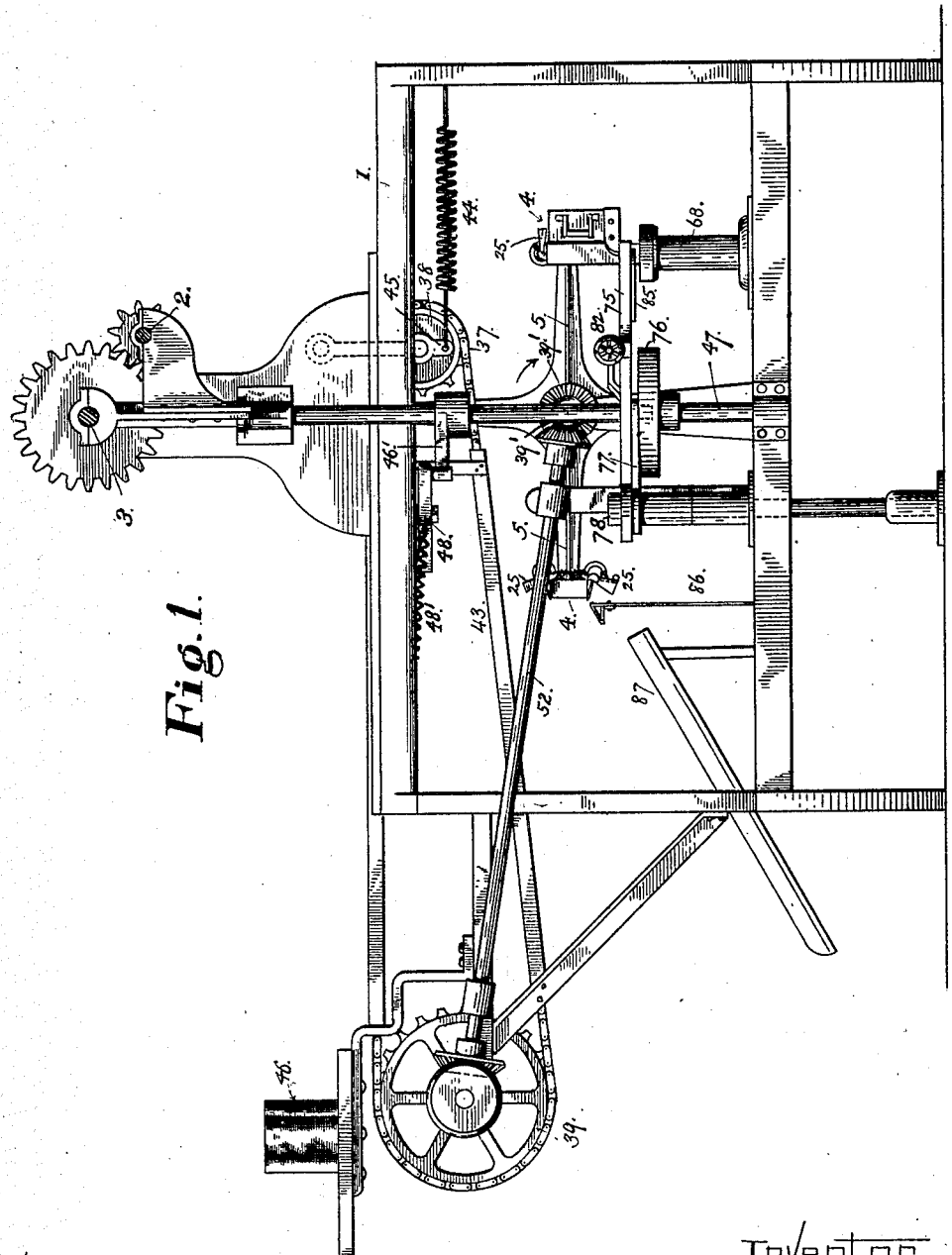

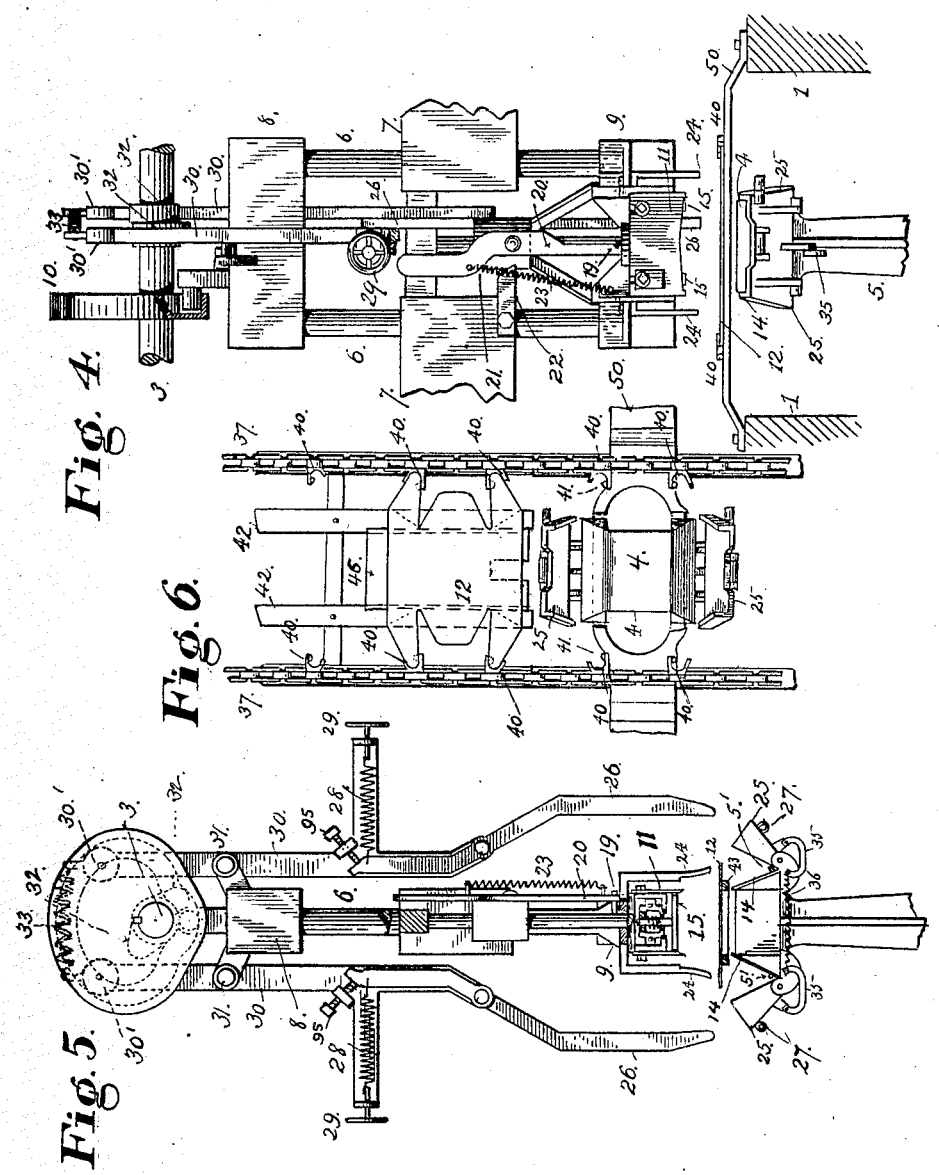

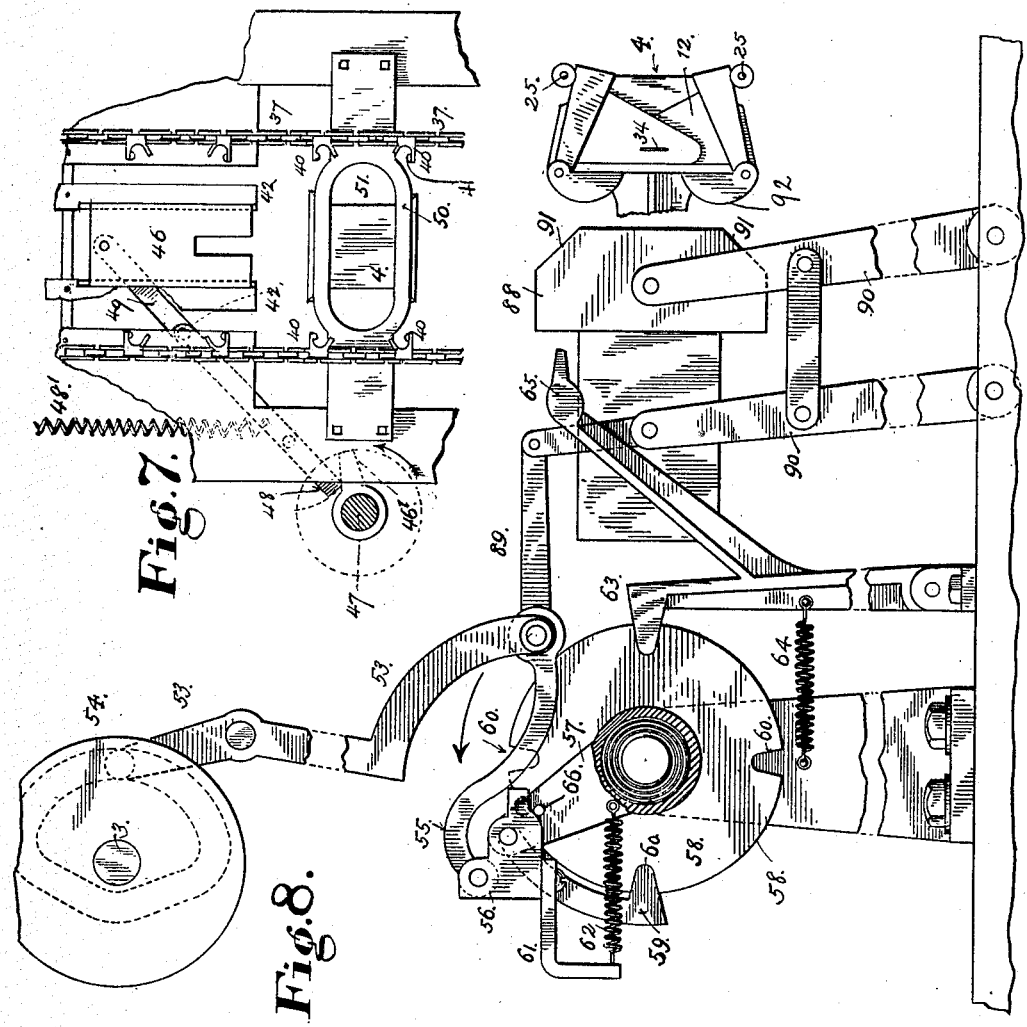

No. 860,398. PATENTED JULY 16, 1907.
J. E. LYNAM.
MACHINE FOR MAKING BERRY BOXES.
APPLICATION FILED JULY 31, 1905.
6 SHEETS—SHEET 5.
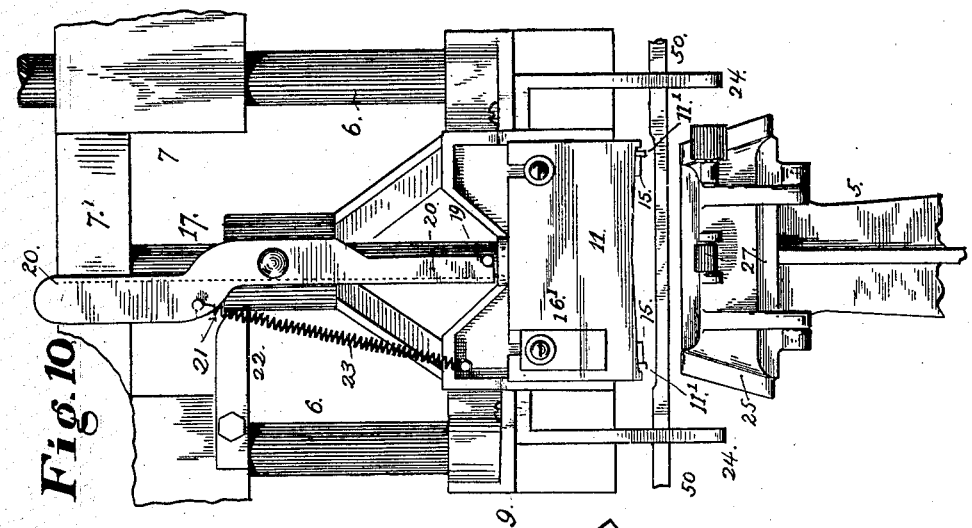
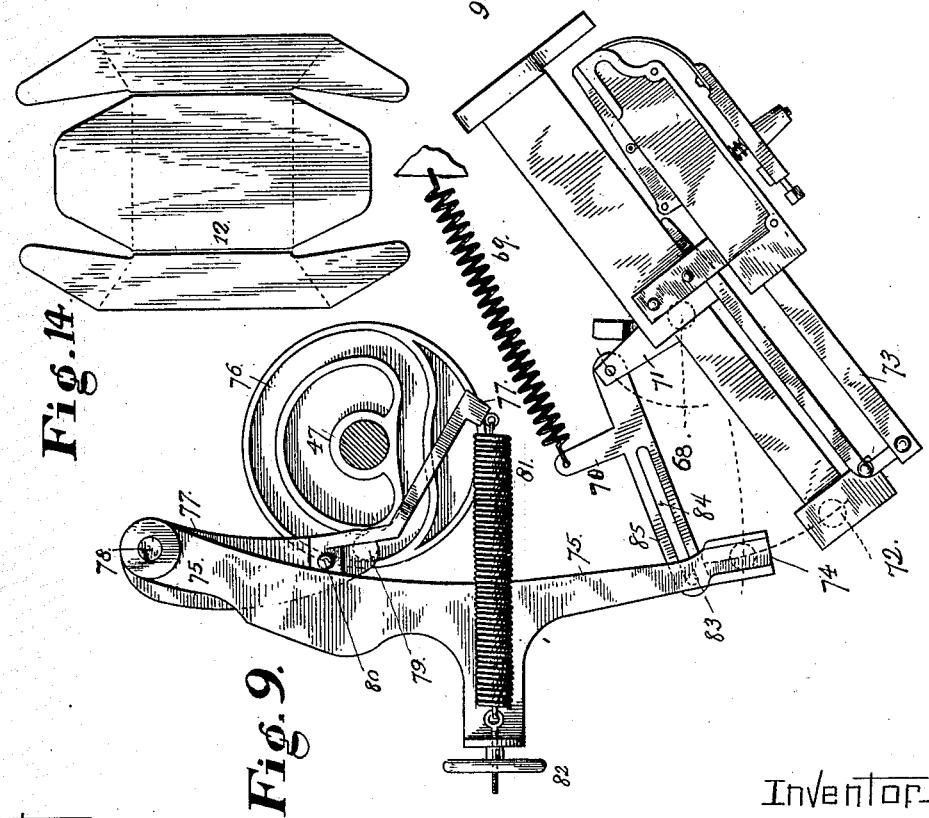
Witnesses.
Inventor
Joseph E. Lynam
By his Attorney No. 860,398. PATENTED JULY 16, 1907.
J. E. LYNAM.
MACHINE FOR MAKING BERRY BOXES.
APPLICATION FILED JULY 31, 1905.
6 SHEETS—SHEET 6.
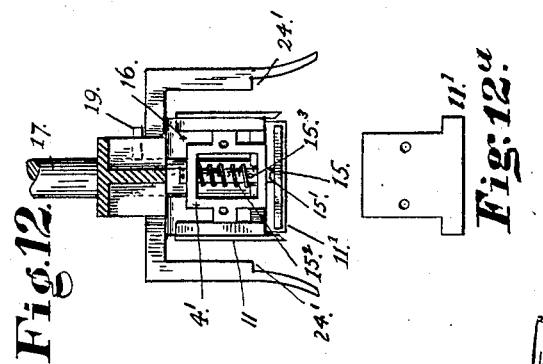
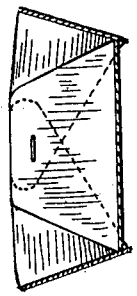
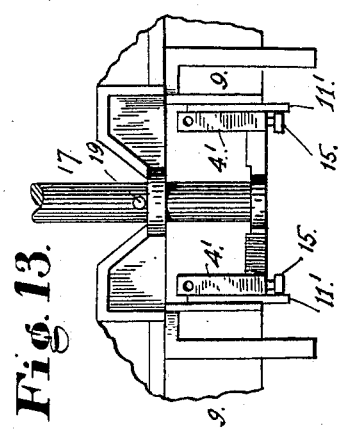
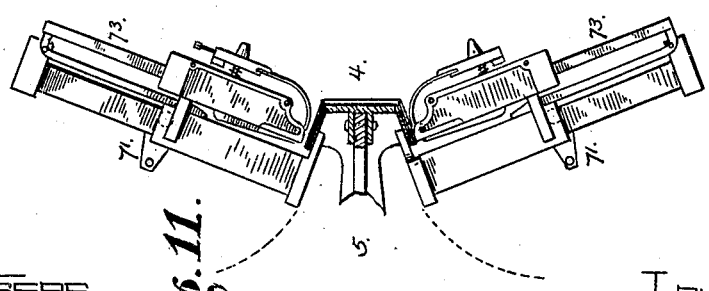
Witnesses
Arthur L. Slee
M. Regner
Inventor
Joseph E. Lynam
By E. E. Osborn
his Attorney.

UNITED STATES PATENT OFFICE

JOSEPH E. LYNAM, OF SAN JOSE, CALIFORNIA.

MACHINE FOR MAKING BERRY-BOXES.

No. 860,398.        Specification of Letters Patent.        Patented July 16, 1907.

Application filed July 31, 1905. Serial No. 271,987.

*To all whom it may concern:*

Be it known that I, JOSEPH E. LYNAM, a citizen of the United States, residing in San Jose, in the county of Santa Clara and State of California, have invented new and useful Improvements in Machines for Making Berry-Boxes, of which the following is a specification.

My invention relates to machines for manufacturing berry boxes, preferably from a singe piece of veneer or thin box material and has for its object to provide a box or basket in which the bottom is raised so as to permit of the free circulation of air entirely around the box and especially when the boxes are placed one upon another, and thereby avoid the liability of the fruit spoiling from the lack of ventilation as is the case with boxes or baskets made from such chips in the usual manner.

I accomplish this object by cutting the bottom portion of the chip loose from the remaining portion, preferably in connection with the ends of the central or middle portion, and raising it the desired distance before the ends of the middle portion are fastened to the end-pieces of the sides of the box.

With this and other objects in view my invention consists in the improved construction and novel arrangement of parts of a machine as will be hereinafter more fully set forth.

The accompanying drawings illustrate the invention:—

Figure 1 is a side-elevation of the machine. Fig. 2 is a front-view on an enlarged scale, showing the end and lower portion of the stationary-frame broken away; Fig. 3 is a side-view of the machine on the same scale as Fig. 2 with parts broken away. Fig. 4 is a front-view of the cutting and folding mechanism showing those parts at the highest part of their movement and the former in position under the blank-carrier. Fig. 5 is a side-view taken from the left side of Fig. 4. Fig. 6 is a top-view of the stationary cutting-plate over the "former", showing a portion of the traveling blank-carrier and a blank in position. Fig. 7 is a top-view of the endless traveling blank-carrier, the stationary cutting-plate between the "former" and the cutting and folding devices, and the slidable bridge on which the blank is carried to its position over the "former." Fig. 8 is a side-view, on an enlarged scale, of the mechanism that rotates the formers and discharges the finished basket. Fig. 9 is a plan or top-view of one of the stitchers or staple forming and driving-devices, and the operating mechanism. Fig. 10 is a front-elevation on an enlarged scale of the reciprocating cutter-head and the devices that fold the sides and ends of the blank. Fig. 11 is a top-view of the "stitchers", showing their position with relation to the "former" when the staples are being driven in both ends of the basket. Fig. 12 is a side-view of the reciprocating, cutting and folding head showing the folder on one side removed from the head. Fig. 12$^a$ is a view of the folder. Fig. 13 is a front-view of the head showing the cutters removed and the folders and strippers in place. Fig. 14 is a plan of the blank showing the parts that form the sides separated from the bottom and ends. Fig. 15 is a transverse sectional-view of the finished box.

Referring more particularly to the drawings 1 indicates a frame at the upper portion of which are mounted the motor-shaft 2 and the operating shaft 3. Reciprocally mounted upon the frame is a plunger which is adapted to be moved toward and from a series of "formers" 4 mounted at the extremities of the spokes of a wheel 5. The plunger is composed of two side rods 6 which reciprocate in bearings in brackets 7 projecting inwardly from the sides of the frame and two heads or blocks 8 and 9, and it is driven by means of a cam 10 on the shaft 3, as shown more particularly in Figs. 2, 4 and 5. On two sides of the plunger opposite each other blades or cutters 11 are arranged in position for engagement with and cutting the chip or blank 12 into three pieces, preferably lengthwise of the blank as shown by full lines in Fig. 14. After the blanks have been cut in this manner they are carried to the "former" 4 in position to be bent into the desired shape. Two sides of the "former" are each provided with ribs or raised portions 14 which virtually form a recess in the bottom of the former which is as deep as it is desired to have the bottom raised in the completed box, and into which recess the central portion is forced or carried by two followers or strippers 15. The followers 15 are arranged on the plunger between the cutters 11 in position for forcing the central portion of the blank into the recess.

Two blades $11^1$ are each rigidly secured between a recessed block $4^1$ and the inner face of one end of the head 9 so as to be movable with the head and fold the ends of the middle strip of material over two of the edges of the former 4. A stem $15^1$ from each stripper 15 extends through the block $4^1$ and through a spring $15^2$ seated in the recess of the block. A pin $15^3$ projects through the stem and engaging with the lower end of the spring $15^2$ compresses the spring when forced inward by the stripper engaging with the material and forcing it between the ribs 14 or into the recess in the head. When the plunger rises after having folded the material upon the "former", the compressed springs force the stems out and thereby hold the strippers against the bottom of the box until after the blades $11^1$ have been withdrawn from engagement with the material, and thus prevent the accidental movement of the box on the former by the friction of the blades with the material in being withdrawn.

The cutters 11 are mounted upon a head 16 at the end of a short rod or stem 17 which is adapted to be moved back and forth through a collar 18 on the plunger-head 9. The head engages with the ends of the block $4^1$ and is guided thereby and it is locked so as to be moved rigidly with the plunger during a part of its movement by means of a pin 19 which engages with a shoulder at the lower end of a lever 20. The upper portion of the lever is provided with an inclined face or shoulder 21 which is adapted to engage with a stop 22 on one of the brackets 7 and swing the lever upon its pivot so as to throw the shoulder at the lower end out of engagement with the pin, and thereby permit the knives to stop before they engage with the former while permitting the forward movement of the plunger to complete the formation of the box. A stop $16^1$ engages with a cutting-plate 50 and prevents the cutters from striking the formers 4.

On the up-stroke of the plunger the upper end of the stem 17 engages with a bridge or cross piece $7^1$ and forces the parts into their normal position where they are held by the reëngagement of the shoulder with the pin 19 when the lever is automatically swung over by the spring 23. Fingers 24 at the ends of the plunger 9 engage with the sides of the blank 12 and carry them down onto the former in position to be engaged by clamps 25. The fingers are preferably notched or provided with shoulders $24^1$ for engaging with the edges of the side-strips of material and holding them upon pins $5^1$ on the former in their correct position relative to the bottom or middle-piece. After the severed pieces of the blank have thus been carried forward and pressed upon the former 4 with the central portion at the desired distance in advance or forward of the lower edges that form the bottom of the box, the ends of the pieces are folded inward by two levers 26 so as to overlap each other; said levers being adapted to engage with the clamps 25 and swing them from the open to the closed position, as shown in Figs. 3 and 5. The clamps are preferably provided with rollers 27 with which the lower ends of the levers engage, while the upper ends of the levers are each connected with a spring 28 for giving the levers a yielding engagement with the clamps the tension of the springs being regulated by means of screws 29. Each of the levers 26 is pivotally mounted at the lower end of a lever 30, which is pivotally mounted at 31 to the upper head 8 of the plunger, and with its upper end provided with an anti-friction roller $30^1$ in position to be engaged by cams 32 on the shaft 3. The cams 32 are secured to the shaft 3 so as to stand opposite to each other, and the upper ends of the levers are connected by a spring 33 which normally holds them toward each other and causes their lower ends to hold the levers 26 out far enough to avoid engagement with the clamps 25 when the plunger is moved downward.

The cams are arranged a trifle out of diametrical alinement as shown in Fig. 5, so that one of them will engage with the roller $30^1$ at the top of its lever and move one lever an instant before the other one moves, so as to bend the ends of one side of the box in advance of the ends of the other side and thereby prevent any possible conflict between the ends as they are being bent in upon the "former." The ends of the middle portion are bent in advance of either of the side-pieces, so that when the ends are stitched together as shown at 34 the side ends will overlap the ends of the middle portion and each other in the usual manner. The folding levers 26 are adjusted by screw stops 95 on the levers 30.

The clamps 25 are provided with curved links 35 at their pivotal edges which extend below the pivots and are connected by means of a spring 36. The links and springs are so arranged that normally the pivot-points are below the hinges of the clamps and hold the clamps in their open position, but as soon as the clamps have been forced inward by the levers 26 said pivot points will pass above the hinges and the spring will be drawn up nearly into a line with the hinges and will then hold the clamps in their closed position.

The chips or blanks 12 are carried into their position over the former by means of an intermittently movable carrier which preferably consists of two chains 37 passing over wheels 38 and 39. The inner or adjacent sides of the chain are provided with substantially U-shaped clips 40 for the reception of the ends of the blanks, a stud or support 41 on each clip preventing the blank from falling from the chains. The upper portion of the carrier is arranged to travel on top of a series of strips 42 on the frame 1 and the lower portion of the carrier preferably runs through guides 43. The chains are held under proper tension at all times by means of springs 44 which engage with pivoted arms 45 in which the stud axles of the wheels 38 are mounted.

In feeding the chips to the machine, they are taken one at a time from a pile 46 by an attendant and placed on the clips 40 of the chains by which they are carried forward by the intermittent movement of the carrier. The inner strips 42 terminate at a short distance from the former 4 and are arranged at a distance apart for the reception of what I shall call a bridge 46 which is slotted at its forward end for the passage of one of the clamp-closing levers 26 and is reciprocated between the strips 42 by means of a cam $46^1$ on a shaft 47 which operates the stitch-forming mechanism. Every time the shaft makes a revolution a box is completed and the arm is caused to engage with a lever 48 pivotally secured to the underside of the table and reciprocates the bridge by means of a link 49 shown in dotted lines in Fig. 7. The bridge moves forward simultaneously with the movement of the chip and prevents it from engaging with the cutting-plate 50 which is secured at its ends to the sides of the frame, and is immediately returned to its normal-position by a spring $48^1$ as soon as the cam $46^1$ passes beyond the end of the lever 48. As soon as the blank has been placed over or upon the plate the plunger descends and the knives cut it into three pieces along the lines 13 and the central portion passes down through an opening 51 in the plate and the side-pieces fall over the sides of the plate into the spaces between the clamps 25 and the former 4 and the pieces are then all bent into shape and held there by the clamps until stitched and finally discharged.

The carrier is driven by means of a shaft 52 which actuates the shaft of the wheels 39 at one end and is actuated by a gear-wheel $39^1$ on the axle of the wheel 5 at the other. The wheels 5 and $39^1$ are given an intermittent motion by means of a lever 53 which is pivotally mounted on one side of the frame 1 with its upper end engaged or actuated by a cam 54 on the shaft 3. A link 55 is pivotally connected with the lower end of the lever and with a block 56 which is pivotally connected with an arm 57 extending out from the axle of wheel 5 and the block is provided with a hook 59 which is adapted to engage with recesses 60 in the periphery of a disk 58 on said axle.

A bracket arm 61 is secured to the block, and between it and the arm 57 is a spring 62. A stop or detent 63 is pivotally mounted on the base of the frame in position to have its nose or free end automatically drawn into one of the recesses 60 by a spring 64 and thereby hold the disk and wheels against rotation.

The stop is provided with an arm or projection 65 which extends into the path of and is adapted to be engaged by the roller-stud 53[1] on the lower end of the lever 53 when the lever is operated preparatory to rotating the disk 58 and wheels 5 and 39[1]. When the lever 53 begins to move toward said arm for unlocking the disk the block 56 is swung on its pivot at the end of arm 57 until it engages with a pin 66 during which movement the free end of the hook 59 is withdrawn from its recess 60 which will permit the block and its connected parts to be moved or swung over the desired distance without rotating the disk. Just before the lever reaches the limit of its movement it engages with the projection 65 and withdraws the stop or detent 63 from its recess and also moves the end of hook 59 into position for engaging with a new recess in the disk. On the return movement of the lever the spring 64 will cause the hook to engage with the recess in the plate as soon as the pull of the lever is released and the disk will thereby be carried back into its normal position and the wheels 5 and 39[1] will be given a partial rotation and the detent will have been permitted to engage with the edge of the disk and will be drawn into a recess by the spring 64 as soon as the movement of the lever is completed. This movement of the wheel 5 will carry forward the former 4 which has previously been located under the plunger and place the box in position at the stitch-forming mechanism.

The main portion 67 of the stitch forming mechanism is pivotally mounted on a suitable standard 68. The stitching mechanism may be of any desired form of construction and forms no part of this invention and is therefore not more particularly described and as there are two of them, one for each end as shown in Figs. 9 and 11, the mechanism for operating them is also arranged in duplicate, and the description of one will be applicable to the other. In their normal position as shown in Fig. 9 the stitchers are so located as not to be in the path of the arms of the wheel 5, but as soon as the arm with a box thereon is moved into position the stitcher is swung into its operative position as shown by dotted curved lines in Figs. 9 and 11, with its nose or inner portion between the side of the former and the ends of the box as shown in Fig. 11.

The stitcher is moved by means of a spring 69 engaging with one arm of an angular-lever 70 which is pivotally connected with a projection 71 on the stitcher. This movement of the stitcher causes a stud 72 on the outer end of its plunger 73 to enter a recess 74 at the free end of an arm 75 so that as soon as the arm is moved inward by a cam 76 on the shaft 47 the plunger 73 will be driven in and the ends of the basket secured together by means of the stitches 34. The arm 75 and an arm 77 are pivotally mounted at the upper end of a standard 78 and the arm 77 is provided with two pins 79 and 80, one of which is in the slot of the can 76 and the other one engages with the arm 75 and forces it back as the pin 79 is moved by the cam 76. The arm 77 is extended beyond the pin 79 and has the end of spring 81 connected therewith which will cause the arm 75 to move inward and yet permit of the arm 75 and the plunger 73 stopping in case of an obstruction or failure of the stitcher to operate, without interfering with the operation of the cam. The tension of the spring 81 can be regulated by a take-up wheel 82. Each stitcher is returned to its normal position by means of a pin 83 which moves in a slot 84 in an extension 85 from the lever 70 when the arm 75 moves inward but engages at the outer end when the arm 75 moves outward.

After the box has been stitched, which is performed simultaneously with the formation of a new box on the former which has been carried under the cutting and forming mechanism, the wheel 5 is given two partial rotations or half a revolution which brings the box in position to be discharged over a standard 86 into a spout or trough 87 as shown in Fig. 1. Before the box can drop from the former 4 into the trough it is necessary to release the clamps 25 which is done by means of a block 88 shown more particularly in Fig. 8, which is moved between the clamps by means of a link 89 connected with the lower end of the lever 53. The block is pivotally connected to the upper ends of two pivoted arms 90 and when it is carried forward its inclined faces 91 engage with projections 92, one at one end of each clamp. The projections are preferably movable as in the form of antifriction wheels and are adapted to carry the clamps out far enough, so that the springs 36 will hold them in that position after the block 88 has been withdrawn by the return movement of the lever 53.

As above-described it will be seen that the operation of my machine is substantially continuous and a very desirable box is produced at a minimum of cost. It is also evident that changes or modifications can be made in it and I reserve the right to make all such changes as will come within the scope of my invention.

Having described my invention, I claim:—

1. In a berry-box machine, a former, means for feeding box material thereto, means for cutting the box material to form the bottom and sides of the box and means for forming the material into a box the bottom and the side forming portions of said last mentioned means, being so arranged relative to each other that the bottom of the box will be raised above the lower edges of the sides.

2. In a berry-box machine, a former, means for feeding a single-piece blank thereto, means for severing the bottom from the sides, and means for forming the blank into a box the bottom and the side forming portions of said last mentioned means, being so arranged relative to each other that the bottom of the box will be raised above the lower edges of the sides.

3. In a berry-box machine, a former, means for feeding a single-piece blank thereto, means for severing the blank longitudinally into three pieces, and means for forming said pieces into a box the bottom and the side forming portions of said last mentioned means, being so arranged relative to each other that the bottom of the box will be raised above the lower edges of the sides.

4. In a berry-box machine, a former, means for feeding a single-piece blank thereto, a reciprocating head, knives on the head for severing the blank longitudinal into strips, and means for forming said strips into a box the bottom and the side forming portions of said last mentioned means, being so arranged relative to each other that the bottom of the box will be raised above the lower edges of the sides.

5. In a berry-box machine, a former, means for feeding a single-piece blank thereto, means for severing the blank longitudinally into strips, means for bending the strips upon the former the bottom and the side forming portions of said last mentioned means, being so arranged relative 6. In a berry-box machine, a former provided with raised edges, means for feeding a single-piece blank thereto, means for severing the bottom portion from the sides, means for bending said blank upon the former with the bottom portion between said edges, and means for securing the ends of said pieces together to complete the box.

7. In a berry-box machine, a recessed former, means for feeding a single-piece blank thereto, means for severing the blank longitudinally into strips, means for bending the strips upon the former with the bottom portion in said recess, the ends of the central strip being folded first and the ends of the sides being folded one after the other thereupon, and means for securing said ends in said position.

8. In a berry-box machine, a recessed former, means for feeding material thereto, means for feeding the material on the former with the central portion in said recess, strippers for holding said portion in said recess until the bending means have been withdrawn and means for securing the ends of the material together to complete the box.

9. In a berry-box machine, a recessed former, means for feeding material thereto, a plunger, cutting and bending blades thereon, means for stopping the movement of the cutting-blades, strippers yieldingly connected with the head for holding the central portion of the material in said recess until after the bending blades have been withdrawn from engagement with the material, and means for securing the ends of the strips together to complete the box.

10. In a berry-box machine, a spring in each recess, a recessed former, means for feeding single-piece material thereto, a plunger, a head movably mounted on the plunger, knives on the head, means for locking the head against movement, recessed blocks, blades between the blocks and the plunger, strippers below the blocks, a shouldered stem on each stripper projecting through said block one of said springs with its shoulder engaging with the spring, and means for forming said material into a box.

11. In a berry-box machine, a recessed former, means for feeding a single-piece blank thereto, knives for severing the blank into strips, strippers between the knives for forcing the middle strip into said recess, means for bending the strips upon the former into a box with the bottom above the lower edges of the sides, and means for securing the ends of the strips together to complete the box.

12. In a berry-box machine, a recessed former, means for feeding single-piece material thereto, a plunger, knives and strippers yieldingly connected therewith, means for locking the knives against yielding during a portion of the movement of the plunger, and means for forming said material into a box upon the former with its bottom in said recess.

13. In a berry-box machine, a recessed former, means for feeding material thereto, a plunger, a head yieldingly connected therewith, means for locking the head against yielding during a portion of the movement of the plunger, knives on the head, spring-pressed strippers between the knives, and means for forming said material into a box upon the former with its bottom in said recess.

14. In a berry-box machine, a recessed former, means for feeding material thereto, a plunger, a head yieldingly connected thereto and provided with a shouldered stem, a lever for engaging with said shoulder, a trip for the lever, a spring for returning the lever to its normal position, knives upon the head, strippers between the knives, and means for forming said material into a box with its bottom in said recess.

15. In a berry-box machine, a recessed former, means for feeding material thereto, a plunger, fingers thereon, a head yieldingly connected with the plunger, knives on the head, strippers between the knives, and means for forming said material into a box upon the former with its bottom in said recess.

16. In a berry-box machine, a recessed former, a plunger, thereabove, a perforated cutting plate between the plunger and the former, means for feeding a single-piece blank to said plate, means on the plunger for severing the blank into strips and placing the strips upon the former with the center strip in said recess, and means for securing said strips together.

17. In a berry-box machine, a recessed former, a plunger thereabove, a perforated cutting plate between the plunger and the former, a head yieldingly connected with the plunger, knives on the head, strippers between the knives, fingers on the plunger, and means for forming the material into a box upon the former with the bottom in said recess.

18. In a berry-box machine, a frame provided with strips, a former beyond the ends of the strips, an intermittently movable carrier, a cutting plate above the former, a reciprocating bridge between two of said strips and adapted to be moved over the plate, means for cutting material on the plate and passing it to the former, and means for forming said material into a box.

19. In a berry-box machine, a frame provided with strips, a former beyond said strips, a cutting plate above the former, sprocket-wheels on the frame, two chains on said wheels with a portion of each adapted to travel on top of the outer strips and on opposite sides of the former, a bridge between the inner strips, means for moving the bridge toward and from the former, means for cutting material on the plate and passing it to the former, and means for forming said material into a box.

20. In a berry-box machine, a frame provided with strips, a former beyond said strips, a cutting-plate above the former, two chains having their adjacent sides provided with studded projections and adapted to be moved on the outer strips and upon opposite sides of the former, a reciprocatory bridge between the inner strips and movable toward and from the plate, means for cutting material on the plate and passing it to the former, and means for forming said material into a box.

21. In a berry-box machine, a frame provided with strips, a former, a cutting-plate above the former, a slotted reciprocatory bridge between the said strips and movable toward and from the former, a carrier, a plunger above the plate provided with knives and levers, one of the levers being adapted to pass through the slot in the bridge, and clamps on the former in position to be engaged by said levers and folded against the sides of the former.

22. In a berry-box machine, a former, clamps pivotally secured thereto, links pivotally secured to the clamps, the pivotal points being below the hinges when the clamps are open, a spring connected with said links, a plunger, knives and folders thereon, and levers connected with the plunger in position for engaging with the clamps for folding them against the former.

23. In a berry-box machine, a former, clamps pivotally secured to two of the opposite sides thereof, means for holding the clamps closed or open, a projection and a roller on each clamp, levers for engaging the rollers to close the clamps, a reciprocating block for engaging the projections to open the clamps, a plunger, levers connected with the plunger, and knives and bending mechanism on the plunger.

24. In a berry-box machine, a former, clamps pivotally secured thereto, a plunger, knives and bending mechanism connected with the plunger, and levers yieldingly connected with the plunger for closing the clamps.

25. In a berry-box machine, a former, clamps pivotally secured thereto, a plunger, knives and bending mechanism thereon, two levers connected with the plunger, and a lever yieldingly connected with each of said levers for engaging with said clamps and closing them.

26. In a berry-box machine, a former, clamps pivotally secured thereto, a plunger, knives and bending mechanism thereon, two levers connected with the plunger and each provided with a projection, a lever pivotally secured to the lower end of each of said levers, the lower end of each lever being adapted to engage with one of said clamps and close it, a spring connected with the upper end and with said projection, means for regulating the tension of said springs, and means for swinging said levers when the plunger is at the bottom of its stroke.

27. In a berry-box machine, a former, a clamp pivotally secured thereto, a plunger, knives and bending mechanism thereon, two levers connected with the plunger, the upper end of each of which is provided with an anti-friction wheel, a spring for connecting said upper ends, a lever yieldingly connected with the lower end of each of said levers, the lower end of which is adapted to be forced into engagement with said clamps, a shaft, a cam thereon for reciprocating the plunger, and two cams on the shaft for engaging with said wheels and forcing the upper ends of the levers outward and the lower ends inward.

28. In a berry-box machine, a frame provided with brackets, a shaft provided with a disk cam and two lever cams, the lever-cams extending on opposite sides of the shaft, one in advance of the other, a plunger comprising two rods mounted in said brackets and two heads, knives and bending mechanism connected with the lower head, means for connecting the upper head with the disk cam, two levers pivotally connected with the upper head in position for being engaged by the lever-cams, a spring connected with said levers, a lever yieldingly mounted on each of said levers, a former below the lower head of the plunger, and clamps on the former in position for being engaged by said yielding levers and folded upon the former.

29. In a berry-box machine, a frame, a cutting plate thereon, sprocket-wheels on the frame, a chain-carrier mounted on said wheels, an axle on the frame, a wheel and formers on the axle, means for transmitting motion from said wheel to one pair of the sprocket-wheels, and means for intermittently actuating said wheels and carrier.

30. In a berry-box machine, a frame, a cutting-plate thereon, cutting mechanism above the plate, pairs of sprocket-wheels, swinging supports for one pair of said wheels, springs for holding the supports yieldingly, a wheel mounted on the frame, movable formers, each adapted to be placed under said plate, a shaft for transmitting motion from said wheel to one pair of the sprocket-wheels, and means for intermittently actuating said wheels and carrier.

31. In a berry-box machine, a frame, rotating arms mounted thereon, the outer end of each being provided with a former, means for folding material upon each former at one place, means for securing the ends of the material together at another place, and means for discharging the completed box at another place.

32. In a berry-box machine, a frame, movable formers mounted thereon, means for folding material on said formers, stitching mechanism provided with a plunger, a spring actuated angle-lever connected with said mechanism for moving it into and out of operative position, an arm for actuating the plunger, and a cam for actuating said arm.

33. In a berry-box machine, a frame, movable formers mounted thereon, means for folding material on said formers, stitching mechanism provided with a plunger, a pin on the plunger, a slotted spring-actuated angle-lever connected with said mechanism for moving it into and out of operative position, an arm provided with a recess for the reception of said pin, a pin for the slot in the arm, and a cam for actuating said arm.

34. In a berry-box machine, a frame, movable formers mounted thereon, means for folding material on said formers, stitching mechanism provided with a plunger, a spring actuated lever for moving said mechanism into and out of operative position, a cam, two pivoted arms, one of which is adapted to actuate the plunger and the other is provided with two pins, one of which pins engages with the cam and the other with the first mentioned arm, and a spring connected with said arms.

35. In a berry-box machine, a frame, movable formers mounted thereon, means for forming boxes on the formers, a lever and two links for releasing a completed box and moving an empty former into position for receiving material for another box.

36. In a berry-box machine, a frame rotatable arms mounted thereon provided with formers, a recessed disk for rotating said arms, a hook and a lock for engaging with said recesses, means for releasing a completed box, a lever adapted to release the lock, and two links connected with the lever, one of which is connected with the hook and the other with the box releasing mechanism.

37. In a berry-box machine, a frame, rotatable arms mounted thereon provided with formers, a recessed disk and an arm on the axle thereof, a block pivotally mounted on the arm on the axle, a hook and a bracket connected with the block, a spring between the bracket and said arm, a lever, a link from the lever to the block, means for locking the disk against movement, and means for releasing a finished box from a former.

38. In a berry-box machine, a frame, rotatable arms thereon provided with formers, clamps on the formers each of which is provided with a projection, means for closing the clamps, a block mounted to be reciprocated toward and from said clamps and provided with inclined faces for engaging said projections, means for locking said arms against movement, a lever, and means connected with the lever for releasing the arms and rotating them and reciprocating the block.

39. In a berry box machine, a frame, rotatable arms thereon provided with formers, clamps on the formers, means for closing the clamps, a block pivotally mounted in position for opening the clamp a recessed disk for rotating the arms, a detent for engaging with said disk and provided with an extension, a lever connected with the block and adapted to engage with said extension, and a hook connected with the lever for engaging with said disk and rotating the arms.

In testimony whereof I have hereunto set my name to this specification in the presence of two subscribing witnesses.

JOSEPH E. LYNAM.

Witnesses:
CHARLES CLARK,
GEO. D. SMITH.